(12) United States Patent
Voellmer

(10) Patent No.: US 9,371,855 B2
(45) Date of Patent: Jun. 21, 2016

(54) FLEXURE BASED LINEAR AND ROTARY BEARINGS

(75) Inventor: George M. Voellmer, Takoma Park, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 1252 days.

(21) Appl. No.: 11/860,830

(22) Filed: Sep. 25, 2007

(65) Prior Publication Data

US 2008/0292392 A1    Nov. 27, 2008

Related U.S. Application Data

(60) Provisional application No. 60/939,146, filed on May 21, 2007.

(51) Int. Cl.
*F16C 11/04*    (2006.01)
*F16C 32/02*    (2006.01)

(52) U.S. Cl.
CPC ............... *F16C 32/02* (2013.01); *Y10T 403/45* (2015.01)

(58) Field of Classification Search
CPC .............................. Y10T 403/45; F16C 32/02
USPC .......... 403/167, 168, 220; 248/371, 560, 580, 248/581
See application file for complete search history.

(56) References Cited

U.S. PATENT DOCUMENTS

| | | | |
|---|---|---|---|
| 3,419,238 A * | 12/1968 | Flory .................... | 248/163.1 |
| 3,680,401 A | 8/1972 | Shaw | |
| 4,720,088 A | 1/1988 | Tamura | |
| 4,818,089 A | 4/1989 | Mefferd | |
| 4,916,340 A * | 4/1990 | Negishi ..................... | 310/12.13 |
| 5,678,944 A | 10/1997 | Slocum et al. | |
| 5,748,827 A | 5/1998 | Holl et al. | |
| 5,801,891 A * | 9/1998 | Lloyd ..................... | 359/871 |
| 6,324,933 B1 | 12/2001 | Waskiewicz et al. | |
| 6,478,434 B1 * | 11/2002 | Streetman et al. ......... | 359/872 |
| 6,543,740 B2 * | 4/2003 | Gaunt et al. .............. | 248/476 |
| 6,850,675 B1 * | 2/2005 | Calvet et al. .............. | 385/52 |
| 6,972,885 B2 | 12/2005 | Hiley et al. | |
| 7,043,879 B2 * | 5/2006 | Hulls et al. .............. | 52/1 |
| 7,075,699 B2 | 7/2006 | Oldham et al. | |
| 7,113,688 B2 | 9/2006 | Calvet et al. | |
| 7,420,752 B2 * | 9/2008 | Shibazaki ............... | 359/811 |
| 2003/0047660 A1 | 3/2003 | Gaunt et al. | |
| 2005/0069376 A1 * | 3/2005 | Blanding ............... | 403/30 |
| 2005/0107881 A1 * | 5/2005 | Alleyne et al. ......... | 623/17.15 |
| 2007/0018604 A1 | 1/2007 | Montesanti et al. | |

FOREIGN PATENT DOCUMENTS

| | | |
|---|---|---|
| EP | 02024623.7 A1 | 7/2003 |
| WO | 9101848 A1 | 2/1991 |
| WO | 2005033762 A2 | 4/2005 |

\* cited by examiner

*Primary Examiner* — Daniel P Stodola
*Assistant Examiner* — Nahid Amiri

(57) ABSTRACT

A flexure based linear bearing includes top and bottom parallel rigid plates; first and second flexures connecting the top and bottom plates and constraining exactly four degrees of freedom of relative motion of the plates, the four degrees of freedom being X and Y axis translation and rotation about the X and Y axes; and a strut connecting the top and bottom plates and further constraining exactly one degree of freedom of the plates, the one degree of freedom being one of Z axis translation and rotation about the Z axis.

11 Claims, 3 Drawing Sheets

FLEXURE BASED LINEAR AND ROTARY BEARINGS

CROSS-REFERENCE TO RELATED APPLICATIONS

The present application claims the benefit of priority of U.S. provisional patent application Ser. No. 60/939,146 filed on May 21, 2007, which is hereby incorporated by reference.

ORIGIN OF INVENTION

The invention claimed herein was made by an employee of the United States Government, and may be manufactured and used by or for the Government for governmental purposes without the payment of any royalties thereon or therefore.

BACKGROUND OF THE INVENTION

The present disclosure relates in general to bearings and in particular to flexure based bearings.

Precise, parallel motion is optimal, for example, in optical devices such as polarization modulators. The amount of translation may be on the order of a fraction of a millimeter. In some applications, the optical device must operate in a cryogenic environment. Known parallel plate interferometric devices use three linear actuators equally spaced around the optical elements to establish plate spacing, tip and tilt. The three actuator systems have fairly complex control systems, and there is inevitable cross-coupling between the controlled axes. Cross-coupling leads to position noise and lower control bandwidth.

Single actuator, linear roller bearing systems are known, but do not have sufficient accuracy. In addition, when the greases are removed for cryogenic operation, the bearings have a short life. Traditional double blade flexure bearings have internal stresses, which cause them to deflect unacceptably upon cooling. Thus, there is a need for a single actuator bearing system that can operate accurately in cryogenic temperatures.

SUMMARY OF THE INVENTION

The disclosure describes a bearing for use with parallel plates and a single actuator.

The disclosure further describes a bearing that can operate in a cryogenic environment.

Additionally, the disclosure describes a bearing that is kinematic and has minimum internal stresses.

One aspect is a bearing, comprising top and bottom parallel rigid plates; first and second flexures connecting the top and bottom plates and constraining exactly four degrees of freedom of relative motion of the plates, the four degrees of freedom being X and Y axis translation and rotation about the X and Y axes; and a strut connecting the top and bottom plates and further constraining exactly one degree of freedom of the plates, the one degree of freedom being one of Z axis translation and rotation about the Z axis.

In one embodiment, the plane defined by the X and Y translational constraint axes of the first flexure is parallel to the plane defined by the X and Y translational constraint axes of the second flexure.

The centers of rotation of the first and second flexures define a line that is perpendicular to the parallel planes of constraint. The line defined by the centers of rotation of the first and second flexures does not intersect the center of the strut. Preferably, the strut lies in one of the parallel planes of constraint of the first and second flexures.

Another aspect is a method making a bearing comprising providing a single billet of material; using wire EDM, rough machining the billet of material; annealing the rough machined billet; and using wire EDM, fine machining the annealed billet. In one embodiment, the single billet of material is titanium.

Each of the rough and fine machining steps may comprise machining a first cross-section, rotating the billet of material ninety degrees and then machining a second cross-section.

A further aspect is a bearing comprising top and bottom parallel rigid plates; first and second rotary joints connecting the top and bottom plates and constraining exactly four degrees of freedom of relative motion of the plates, the four degrees of freedom being X and Y axis translation and rotation about the X and Y axes; and a strut connecting the top and bottom plates and further constraining exactly one degree of freedom of the plates, the one degree of freedom being one of Z axis translation and rotation about the Z axis.

Each rotary joint may comprise two rigid members pinned at first ends to the top and bottom parallel rigid plates, respectively and pinned at second ends to a center pin.

Further features and advantages of the invention will become apparent from the following detailed description taken in conjunction with the following drawing.

DETAILED DESCRIPTION OF THE PREFERRED EMBODIMENTS

The disclosure fills the need for a single actuator, vacuum compatible device that maintains its functionality and positioning while cooling down from 300 degrees Kelvin to 4 degrees Kelvin. One purpose of the invention is to translate a mirror plus or minus 0.45 mm in a cryogenic environment while not causing the mirror to tip or tilt more than 2 arc seconds.

Figure 1:
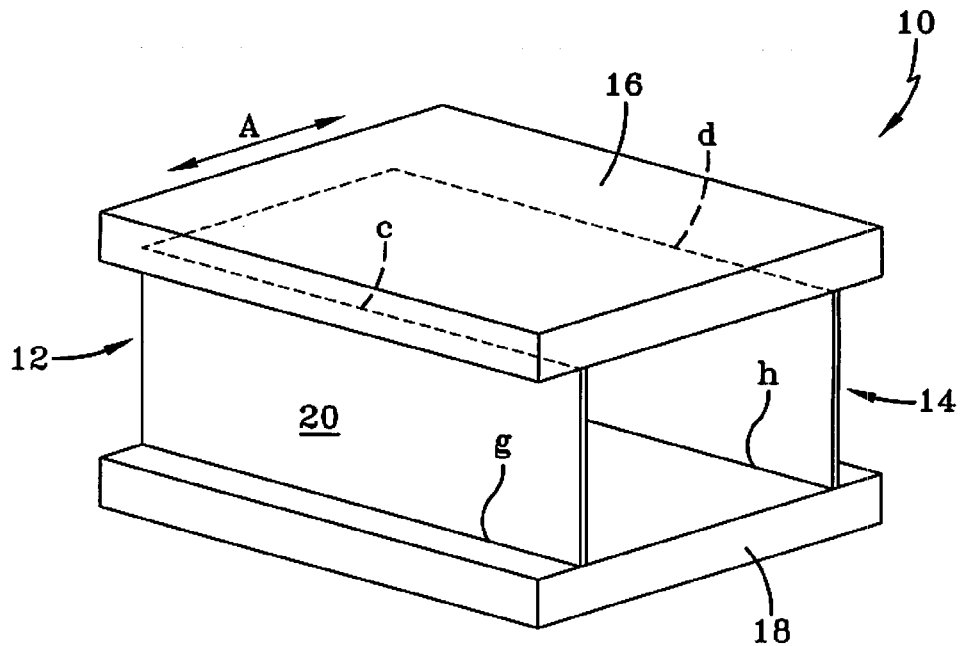
FIG. 1 is a perspective view of a traditional double blade flexure.

FIG. 1 shows a traditional double blade flexure 10. The flexure has two wide blades 12, 14 connected at their ends by rigid parallel plates 16, 18. Blades 12, 14 are thin (compared to plates 16, 18) and rectangular. Plates 16, 18 may have holes formed therein (not shown) for fastening to another device. One of the plates, for example, bottom plate 18 is fixed. Top plate 16 translates in the direction of arrow A with respect to the bottom plate 18. The blades 12, 14 are usually able to maintain fairly accurate parallelism between the two plates 16, 18. Because the geometry, dimensions and internal stress states of blades 12, 14 are not exactly the same, the differences pose a problem when very precise motion is required. This is especially so when there will be significant temperature changes, such as in cryogenic applications.

Plate 16 is attached to blades 12, 14 along dashed lines c and d, respectively. Plate 18 is attached to blades 12, 14 along lines g and h, respectively. It is not possible to make blades 12, 14 perfectly planar and to make the lines c, d, g and h perfectly parallel. When plate 16 translates in the direction of arrow A with respect to plate 18, there is inevitably some twist introduced into the flexure 10. Hence, the traditional double blade flexure 10 is not kinematic. A kinematic apparatus is one in which, for each degree of freedom of the apparatus that is constrained, there is a single, unique constrainer (constraint). If an apparatus is overconstrained and, therefore, not kinematic, additional stresses and misalignments are introduced, compared to a kinematic apparatus.

An additional problem with the traditional double blade flexure 10 is that internal stresses in the blades 12, 14 generally cause them to be slightly curved or cupped. As the blades 12, 14 are deflected, particularly through their neutral points, this cupping "pops through." The way the cupping "pops through" is usually not repeatable, and causes positioning errors.

Figure 2:
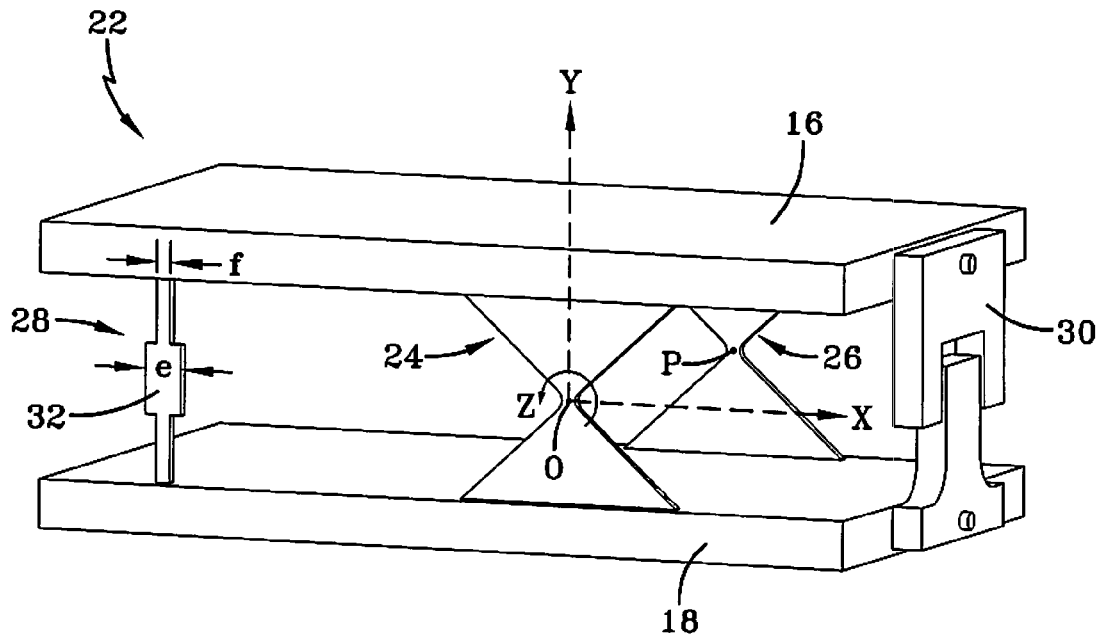
FIG. 2 is a perspective view of one embodiment of the inventive bearing.

FIG. 2 is a perspective view of one embodiment 22 of the inventive bearing. Bearing 22 includes top and bottom parallel plates 16, 18. In place of the traditional rectangular blades 12, 14, there are three components: flexures 24 and 26 and an "outrigger" strut 28. A mechanical stop 30 may be used to limit the relative motion of the plates 16, 18.

As shown in FIG. 2, bearing 22 will be described and claimed using a rectangular coordinate system with an origin O at the center of flexure 24, a vertical Y axis, a horizontal X axis and a Z axis perpendicular to the XY plane and passing through the origin O and the center P of flexure 26. The arrangement of the X, Y and Z axes is for descriptive purposes only and is not meant to limit the invention to any particular orientation but only to aid in describing the functional features of the invention.

Considered together, flexures 24 and 26 constrain exactly four degrees of freedom of relative motion between plates 16, 18, specifically, X and Y axis translation of the plates and rotation of the plates about the X and Y axes. The narrow points of flexures 24, 26 at O and P, respectively, allow rotation about the Z axis and, therefore, no overconstraint is imposed, as is the case with blades 12, 14.

In one embodiment, the flexures 24, 26 are parallel, that is, the plane defined by the X and Y translational constraint axes of the flexure 24 is parallel to the plane defined by the X and Y translational constraint axes of the flexure 26. It is preferable, but not required, that the centers of rotation O, P of the flexures 24, 26 define a line OP that is perpendicular to the parallel planes of constraint.

The strut 28 constrains exactly one degree of freedom of relative motion of the plates 16, 18. In the embodiment of FIG. 2, the one degree of freedom constrained by the strut 28 is rotation of the plates about the Z axis. The optional mechanical stop 30 provides a limit for the Z axis translation of one plate relative to the other plate. The flexures 24, 26 and strut 28 are of sufficient dimensions so that only elastic strain occurs during Z axis translation of one plate with respect to the other, within the translational limits imposed by the stop 30.

Figure 3:
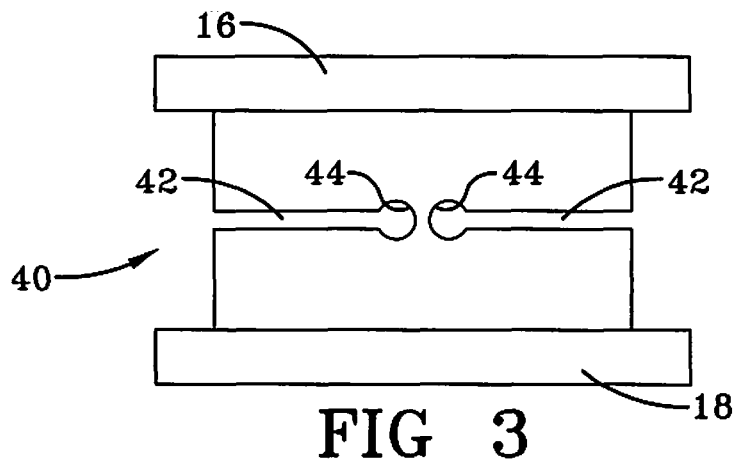
FIG. 3 is a front view of one embodiment of a notched flexure.

Preferably, although not necessarily, flexures 24 and 26 are identical. Thus, a single flexure 24 will be described. Flexure 24 has much less surface area than the known blade 12. In the embodiment of FIG. 2, flexure 24 is a notched flexure having a generally hour-glass or X-shape. However, other geometries are possible. For example, FIG. 3 is a front view of another embodiment 40 of a notched flexure. The midsection of flexure 40 has a pair of channels 42 that end in circular openings 44. An advantage of flexure 24 over flexure 40 is the decreased surface area of flexure 24 realized by the hour-glass shape. The less the surface area of the flexure, the less the chance of the "cupping" problem described above with reference to blades 12, 14.

Figure 4:
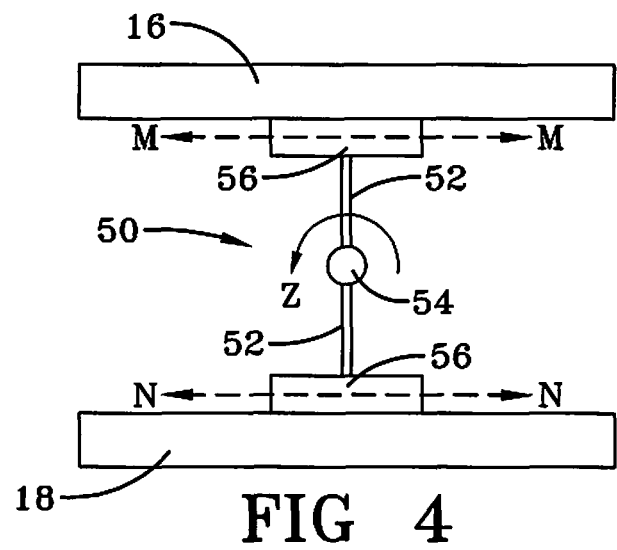
FIG. 4 is a front view of one embodiment of a rotary joint.

Alternatively, the functionality of the flexure 24 may be embodied in a rotary joint 50 shown in FIG. 4. Joint 50 includes two rigid members 52 pinned at first ends 56 to plates 16, 18 respectively and pinned at second ends to center pin 54. Thus, first ends 56 may rotate about axes M-M and N-N, respectively, and the second ends may rotate about the Z axis. If a minimum of friction is required, flexure 24 is preferred over rotary joint 50.

Referring again to FIG. 2, the Z axis must not intersect the center 32 of strut 28. That is, strut 28 is disposed distant the Z axis. Strut 28 need not lie in the plane of constraint XY of flexure 24 or the parallel plane of constraint of the flexure 26. However, the machining process may be simpler if the strut 28 is coplanar with one of the parallel planes of constraint of the flexures 24, 26. As noted above, strut 28 constrains rotation of the plates 16, 18 about the Z axis. Thus, strut 28 may comprise virtually any shape or geometry with sufficient strength to elastically constrain the Z axis rotation of the plates 16, 18. For ease of manufacture, FIG. 2 shows the strut 28 as a rectangular strip having end portions with an X axis width f and an enlarged midsection with an X axis width e. Width e is chosen to prevent or mitigate column buckling of strut 28. Rather than manufacture strut 28 with a constant width e, the end portions are narrowed to a width f to facilitate bending of the strut 28 in an "S" shape during Z axis translation.

Figure 5:
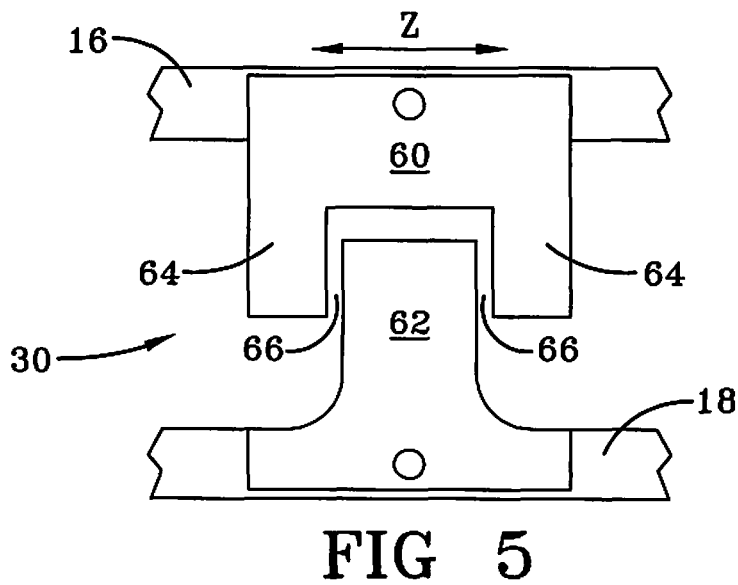
FIG. 5 is a front view of a mechanical stop.

FIG. 5 is a front view of a mechanical stop 30. In FIG. 2, stop 30 is seen from the side. Stop 30 includes a generally U-shaped portion 60 attached to plate 16 and a generally square or rectangular portion 62 attached to plate 18. U-shaped portion 60 includes legs 64 between which portion 62 is disposed. The gaps 66 between the legs 64 and the portion 62 define the maximum Z axis translation of the plate 16. Stop 30 may be bolted to plates 16, 18 after bearing 22 is machined.

Bearing 22 may be machined out of a single billet of material, such as titanium, using wire Electrical Discharge Machining (EDM). Cutting the bearing 22 from a single billet of material ensures that there is no thermal expansion coefficient mismatch between parts and minimum internal stresses. The outline and interior spaces of the bearing 22 are first rough cut to within about 0.125 inches of the final dimensions. The piece is then annealed. Annealing ensures that the final wire EDM cut has negligible internal stresses. The final wire EDM cut is then made. The mechanical hard stop 30 may be fitted between the plates 16, 18 to prevent the bearing 22 from overtravel stresses during handling, assembly and testing. By machining the flexures 24, 26 in an hourglass shape, the area of each flexure 24, 26 is greatly reduced and, consequently, its opportunity to exhibit cupping is also greatly reduced.

The rough machining and final machining processes may each comprise a two step process. First, the cross-section shown in the XY plane of FIG. 2 is machined, and then the side cross-section (rotate the bearing 22 of FIG. 2 ninety degrees around the Y axis so that the flexure 24 and strut 28 are aligned) is machined. The stop 30 is not part of the machining process and is added after all machining is completed. This process results in two struts 28, one of which is cut out.

By fabricating the bearing 22 from a single piece of stress relieved titanium, and by designing the bearing 22 to be kinematic, it is possible to align cryogenic optical (or other) elements attached to the bearing 22 at warm (room) temperatures. Thus, an important advantage of the invention for cryogenic applications is the lack of a need for the tip/tilt actuators required by prior devices for a cold alignment peak-up.

The bearing 22 is designed for use with a single actuator (not shown). When a force is applied to one of the plates, the flexures 24, 26 deflect, thereby moving one plate linearly with high precision. Flexures 24, 26 are entirely flexure based and use no lubricants or rolling or sliding parts. All alignments may be done warm because the invention is kinematic and has few internal stresses. Because only one actuator and sensor are required, there is no cross-coupling between any controlled axes resulting in high control bandwidth and low position noise.

Bearing 22 was manufactured and actuated 0.45 mm at room temperatures. Laser measurements found the bearing to tilt less than 1.5 arc sec. A commercial piezoelectric actuator and control system may be used to provide the required 400 micrometer throw and less than 1 micrometer precision. A capacitive sensor may be used to close the position loop. The actuator may be attached to one of the plates 16, 18 via an "L" bracket such that the actuator's line of action passes through the midpoints O, P of the flexures 24, 26. It can be shown that this configuration produces the minimum tipping of the moving plate as the translational force is applied. The linear actuator may use a mechanical amplification mechanism that resembles a scissors jack with its two ends mounted via crossed flexure universal joints, to prevent any non-parallel motion of the actuator mounting ends from affecting the parallelism of the bearing 22.

Figure 6:
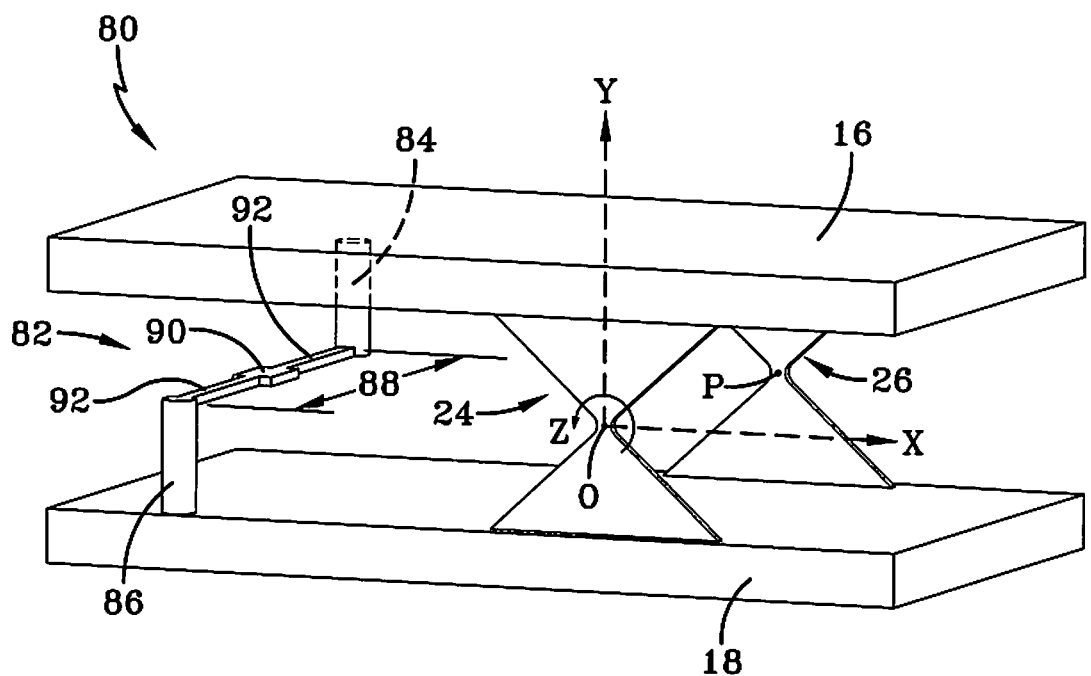
FIG. 6 is a perspective view of another embodiment of the inventive bearing.

Bearing 22 is a linear bearing that provides for relative Z axis translation between plates 16, 18. FIG. 6 shows one embodiment of a rotary bearing 80 that is another aspect of the invention. Plates 16, 18 and flexures 24, 26 are the same as in bearing 22 and the same X, Y, Z coordinate system is used to describe the rotary bearing 80. Bearing 80 is designed for rotation about the Z axis, rather than Z axis translation, as in bearing 22. Thus, stop 30 is not included in bearing 80, although a stop (not shown) that limits rotation about the Z axis may be used.

The principal structural difference between bearings 22 and 80 is the strut. Strut 28 of bearing 22 constrains relative rotation of the plates 16, 18 about the Z axis. Strut 82 of bearing 80 constrains relative translation of the plates 16, 18 along the Z axis. Strut 82 comprises three portions, a pair of rigid supports 84, 86 and a body 88. Body 88 of strut 82 may have the same form as the strut 28 of FIG. 1, that is, a midsection 90 that is wider than its end portions 92. Body 88 is parallel to plates 16, 18.

The rigid supports 84, 86 each connect one end of the body 88 to one of the plates 16, 18. For ease of manufacture, the rigid supports 84, 86 are shown located at the edges of plates 16, 18, although they may be located further inward, if desired. In a preferred embodiment, the longitudinal axis of the body 88 lies on the line OP between the flexures 24, 26, with the rigid supports 84, 86 disposed inwardly of the flexures 24, 26. As in bearing 22, rotary joints 50 (FIG. 4) may be substituted for flexures 24, 26.

Numerous changes, alterations and modifications to the described embodiments are possible without departing from the spirit and scope of the invention as defined in the appended claims, and equivalents thereof.

What is claimed is:

1. A bearing, consisting essentially of:
   a rigid top plate positioned above and parallel to a fixed rigid bottom plate;
   first and second flexures disposed between and connecting aid rigid top plate and said bottom plate, said flexures together constraining relative motion of said top plate relative to said bottom plate in exactly four degrees of freedom, the four degrees of freedom being X and Y axis translation and rotation about the X and Y axes; a mechanical stop connected to the top and bottom plates for limiting Z axis translation of one plate relative to another plate; and
   a strut connecting the top and bottom plates and further constraining exactly one additional degree of freedom of the plates, the one degree of freedom being rotation about the Z axis.

2. The bearing of claim 1 wherein a plane defined by the X and Y translational constraint axes of the first flexure is parallel to a plane defined by the X and Y translational constraint axes of the second flexure.

3. The bearing of claim 2 wherein at least one of the flexures is substantially planar and notched between said top and bottom parallel rigid plates.

4. The bearing of claim 3 wherein the substantially planar notched flexure is generally hour-glass shaped between said top and bottom parallel rigid plates.

5. The bearing of claim 3 wherein the notched flexure is generally X-shaped.

6. The bearing of claim 2 wherein centers of rotation of the first and second flexures define a line that is perpendicular to the parallel planes of constraint.

7. The bearing of claim 6 wherein the line defined by the centers of rotation of the first and second flexures does not intersect a center of the strut.

8. The bearing of claim 7 wherein the strut lies in one of the parallel planes of constraint of the first and second flexures.

9. The bearing of claim 7 wherein the strut comprises end portions and a midsection, the midsection having an X axis width that is greater than an X axis width of the end portions.

10. A bearing, comprising;
    A rigid top plate positioned above and parallel to a fixed rigid bottom plate;
    first and second flexures disposed between and connecting said rigid top plate and said fixed rigid bottom plate, said flexures together constraining relative motion of said top plate relative to said bottom plate in exactly four degrees of freedom, the four degrees of freedom being x and y axis translation and rotation about the x and y axes; and
    a strut connecting the top and bottom plates and further constraining exactly one additional degree of freedom of the plates, the one degree of freedom being rotation about the Z axis; wherein at least one of the flexures is a substantially planar notched plate and is hour-glass shaped between said rigid top plate and said fixed rigid bottom plate.

11. A bearing, consisting of:
    a rigid top plate positioned above and parallel to a fixed rigid bottom plate;
    first and second flexures disposed between and connecting said rigid top plate and said fixed rigid bottom plate, said flexures being substantially planar and notched each having a generally hour glass shape and together constraining relative motion of said top plate relative to said bottom plate in exactly four degrees of freedom, the four degrees of freedom being X and Y axis translation and rotation about the X and Y axes; and
    a strut connecting the top and bottom plates and further constraining exactly one additional degree of freedom of the plates, the one degree of freedom being rotation about the Z axis; wherein at least one of the flexures is a substantially planar notched plate and is hour-glass shaped between said rigid top plate and said fixed rigid bottom plate.

* * * * *